March 18, 1969  E. W. FRIES  3,433,150
FOOD PROCESSING MACHINE
Filed Jan. 10, 1968
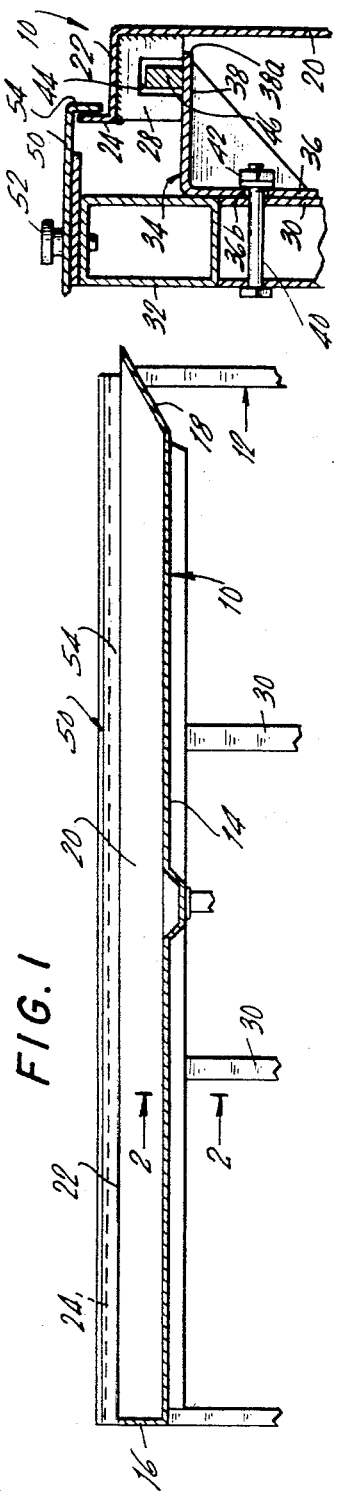
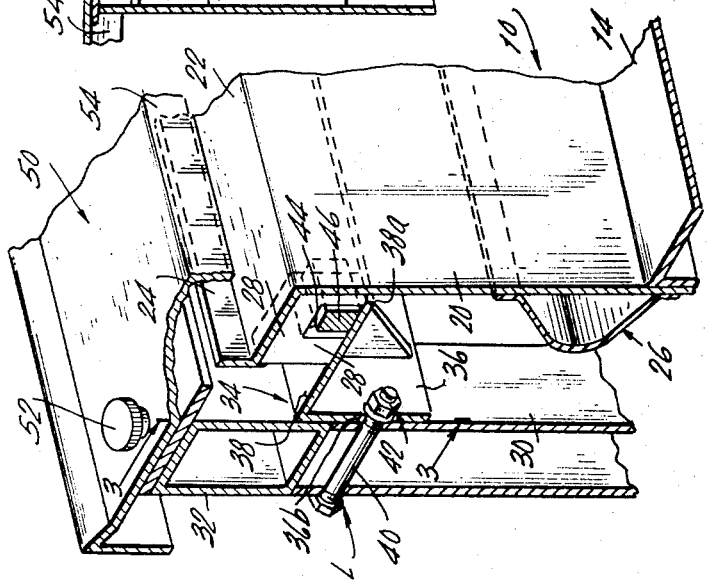
INVENTOR.
EDWARD W. FRIES
BY
Ameter + Rothstein
ATTORNEYS United States Patent Office 3,433,150
Patented Mar. 18, 1969

3,433,150
FOOD PROCESSING MACHINE
Edward W. Fries, Baltimore, Md., assignor to DCA Food Industries Inc., New York, N.Y., a corporation of New York
Filed Jan. 10, 1968, Ser. No. 696,862
U.S. Cl. 99—403                      8 Claims
Int. Cl. A47t *27/14, 27/00*

ABSTRACT OF THE DISCLOSURE

A food processing machine having a support frame and a metallic cooking vessel wherein the cooking vessel is suspended from mounting rails of the support frame by a plurality of space gussets, with the gussets engaging stops on the mounting rails to enable the cooking vessel to expand and contract laterally incident to the heating and cooling thereof within preset limits.

---

The present invention relates generally to food processing apparatus, such as doughnut-frying machines, and in particular to a suspension system for removably mounting the cooking vessel or frying kettle of such machine for controlled expansion incident to the heating thereof during the processing of food (i.e., the frying of donuts).

In food processing machinery, as well as in similar types of equipment, it is often necessary to accommodate a heated medium in a metallic vessel which has welded seams and joints. Incident to the changes in temperature of the heated medium, there is a corresponding expansion and contraction of vessel. As is generally understood, if such vessel were fixedly secured to its supporting structure, there would be a risk that the expansion and/or contraction would set up stresses and strains sufficient to weaken and/or rupture the welds or joints, with a corresponding risk of leakage. As is further understood by those skilled in the fundamentals of machinery design, it is necessary to accommodate such vessels in a supporting structure which permits the vessel to expand and contract incident to the heating and cooling thereof. For example, in commercial fryers, such as for processing doughnuts, a frying kettle or vessel which may be on the order of 20 feet in length receives a substantial charge of frying shortening which will be heated from normal ambient temperature to as much as 500° F. Obviously, the exposure of the frying vessel to these changes in temperature will cause both longitudinal and lateral expansion and/or contraction of the frying kettle in an amount related to the particular engineering design. The choice of materials, the temperature range and like parameters. Thus, it is necessary to make corresponding provision in the environment supporting structure for such kettle to permit the same to accommodate to such expansion and contraction, without unduly stressing or straining the vessel and running the corresponding risk of causing structural damage thereof during use.

It has been suggested that the frying kettle for this type of doughnut-frying machine be suspended in a freely floating manner such that it be capable of expanding and/or contracting in any direction with changes in temperature of the frying shortening. A proposed mounting arrangement includes two laterally spaced series of longitudinally spaced rails disposed in opposed and coextensive relation and accommodating the frying kettle therebetween, with the frying kettle being suspended from the two interrupted supporting rails by outwardly directed mounting flanges each of which terminates in a downwardly turned edge flange. In this type of arrangement, due to the relatively large area of contact between the mounting flanges of the kettle and the interrupted supporting rails therebeneath, it apparently has been the practice to interpose a heat-insulating gasket, as of asbestos, between the underside of the mounting flanges and the supporting rails to attempt to curtail heat transfer from the cooking vessel to the environment supporting structure. In such free-floating structure, not only is heat transfer an inherent problem, but in addition no apparent attempt has been made to limit the lateral and longitudinal expansion and contraction of the frying kettle within preset limits. By establishing a support permitting controlled expansion and contraction as contrasted to a freely floating mount, it is possible to minimize undesirable heat transfer from the cooking vessel to the supporting structure.

Broadly, it is an object of the present invention to provide a supporting or suspending system for a cooking vessel adapted to contain a heated medium, such as frying shortening, which obviates one or more of the aforesaid difficulties. Specifically, it is within the contemplation of the present invention to provide a suspension system for a frying kettle which enables the kettle to expand and contract at least laterally within preset limits incident to the heating and cooling thereof.

It is among the further objects of the present invention to provide a supporting structure for a frying kettle, useful in doughnut-frying machines and the like, in which the frying kettle is mounted such that there is an appreciable reduction in heat transfer from the kettle to the environment supporting structure, with the mounting arrangement being such that the kettle is capable of expanding and contracting laterally and longitudinally within preset limits incident to the heating and cooling thereof.

In accordance with an illustrative embodiment demonstrating objects and features of the present invention, there is provided a food-processing machine which includes a supporting frame having spaced and substantially coextensive mounting rails defining a vessel-receiving space therebetween. A metallic cooking vessel is disposed in the vessel-receiving space and includes upstanding side walls extending about the mounting rails and each having an outwardly directed mounting flange overlying and spaced above the adjacent mounting rails. A plurality of spaced gussets are secured to and depend from each of the mounting flanges and rest upon the adjacent mounting rail to suspend the vessel from the mounting rails. Cooperating means are provided on the gusset and on the mounting rails which are constructed and arranged to enable the vessel to expand and contract laterally, but within preset limits, incident to the heating and cooling thereof. Advantageously, the direct contact area between the heated cooking vessel and the environment supporting structure is limited to the contact between the gussets and the underlying mounting rail. The mounting arrangement is such that, notwithstanding the expansion and contraction, effective clearances are maintained between the cooking vessel and the environment supporting structure.

The above brief description, as well as further objects, features and advantages of the present invention will be more fully appreciated by reference to the following detailed description of a presently preferred, but nonetheless illustrative embodiment of the invention, when taken in conjunction with the accompanying drawings; wherein:

FIG. 1 is a longitudinal section through a typical metallic frying kettle of a food-processing machine mounted in accordance with an illustrative embodiment demonstrating features of the present invention;

FIG. 2 is a perspective view on an enlarged scale, taken substantially along the line 2—2 of FIG. 1 and looking in the direction of the arrows, showing the details of the kettle-mounting arrangement;

FIG. 3 is a sectional view, on a reduced scale, taken substantially along the line 3—3 of FIG. 2 and looking in the direction of the arrows; and FIG. 4 is a sectional view taken substantially along the line 4—4 of FIG. 3 and looking in the direction of the arrows.

Referring now specifically to the drawings, there is only illustrated a typical cooking vessel or frying kettle 10 and its support frame 12, it being understood that the remaining details of the particular food-processing machine are subject to a latitude of modification and change. For a typical environment in which the present invention would find useful application, reference may be made to U.S. Patents Nos. 2,552,441 of May 8, 1951, and 2,633,793 of Apr. 7, 1953, and an article entitled, "Heat Transfer in Hot Fat Cooking," by Horace L. Smith, Jr., appearing in Food Technology, vol. 14, January-December 1960.

Turning now to the details of the illustrative kettle and support, the kettle 10 is seen to include a bottom wall 14, an upright end wall 16 at the entry end of the kettle, an inclined end wall 18 at the exit end thereof and opposite upstanding side walls 20. Contiguous to the upper edges of the upstanding side walls 20, each of the side walls has an outwardly directed mounting flange 22 which terminates in an upwardly directed drip flange 24. Although only one side wall 20 and its associated flanges 22, 24 and mounting structure is shown in the drawings, it will be appreciated that the cooking vessel 10 is longitudinally symmetrical and that the details of the opposite side of the kettle are identical to that specifically illustrated and described herein. Accordingly, it will suffice to describe only one side of the kettle 10 in detail.

The kettle 10 is heated in conventional fashion by circulating an appropriate heating liquid through channels or tubes (i.e. tube 26) that are part of the kettle itself, with the heating liquid being circulated to and from a remote heat exchanger to establish and maintain a requisite elevated temperature for the kettle and the contents thereof. In a typical kettle, the botom wall and/or the side walls may be fabricated in whole or in part of Platecoil heating units of the type manufactured by Tranter Manufacturing Inc. of Lansing, Mich., and/or the Panelcoil units of Dean Products, Inc., of Brooklyn, N.Y.

Secured to and depending from each of the mounting flanges 22 and the adjacent upper portion of the side wall 20 are a plurality of longitudinally spaced gussets 28. Conveniently, the gussets may be welded to the underside of the mounting flange 22 and the adjacent upper end of the side wall 20. As seen best in FIGS. 2 and 4, the gussets 28 are fitted into the junction or external corner formed by the mounting flange 22 and the side wall 20 and impart structural reinforcement to the kettle at space locations lengthwise thereof (see FIG. 3).

The support frame 12 includes plural metal uprights 30 of any appropriate cross section. Traversing the plural uprights along each side of the frame are frame sides or beams 32 which are secured to the uprights 30 in any appropriate fashion and are here illustrated as being of hollow rectangular cross section. Disposed along the inner side of each group of uprights 30 contiguous to the corresponding frame side 32 is a substantially horizontally extending rail 34 which is in the form of an angle iron including a vertically extending leg section 36 and a horizontally extending leg section 38. The vertically extending leg section 36 abuts against the spaced uprights and the frame side 32 and is secured to the uprights by bolts 40. In this illustrative arrangement, the bolts extend from the outer side of the uprights through the vertical leg rectims 36 and secure the mounting rail 34 to the upright by the usual nuts 42, washers, etc. In certain instances, it may be desirable to provide for some limited relative movement of the mounting rail 34 with respect to the remainder of the support frame 12. To this end, the securement bolts 40 contiguous to the opposite ends of the kettle 10 go through bolt holes 36a in the leg section 36 of the rail 34 which are exactly sized for such securement bolts 40. However, at intermediate locations, such as location L, the bolt hole 36b in the leg section 36 of the mounting rail 34 is oversized in relation to the bolt cross section. This permits a corresponding limited relative movement of the mounting rail 3A with respect to the support frame 12 to accommodate for the distorting forces passed on to the support frame incident to the use of the equipment over a prolonged period of time at elevated temperatures. However, it is to be understood that this is an optional feature, the use of which will very much depend on the environmental conditions and may vary from installation to installation.

As seen best in FIGS. 2–4 inclusive, the mounting flanges 22 project outwardly from the opposite sides of the vessel 10 and overlie and are spaced above the horizontal sections 38 of the adjacent mounting rails 34, with the depending gussets 28 resting on the rail section 38 at spaced locations along the length thereof (see FIG. 3). In a typical installation for a kettle having a 20 foot length, it is practical to support the kettle with gussets 28 at a spacing interval of two feet. Obviously, the limited area contact afforded by the underside of the gussets 28 with the rail section 38 is quite small as compared to a kettle suspension system wherein the mounting flange 22 rests directly against the rail section 38.

Cooperating means are provided on the gussets 28 and on the mounting rails 34 to enable the vessel 10 to expand and contract laterally incident to the heating and cooling thereof within present limits. Such cooperating means includes downwardly opening cutouts 44 formed in each of the space gussets 28 and a corresponding stop 46 welded or otherwise secured to the mounting rail 34, in position to be received within the cutout 44. The cutouts 44 are sized in relation to the stops 46 such that the suspended cooking vessel 10 is free for limited lateral expansion and contraction within the present limits established by the width of the cutouts 44 as compared to the cross section of the stops 46. In a typical structure, the clearance at each side of the lateral stops 46 would be of the order of $\frac{1}{16}$ to $\frac{1}{8}$ of an inch. The dimensions and locations of the cutouts 44 and the stops 46 are selected in relation to the rail edge 38a of the horizontal rail section 38 such that a minimum clearance may be always maintained between the rail edge 38 and the adjacent upstanding wall 20 of the kettle 10. In a typical environment, the approach of the upstanding wall 20 to the rail edge 38a may be kept above a minimum of ½ an inch to avoid direct contact therebetween and corresponding heat transfer from the kettle to the environment structure.

Additionally, provision may be made for limiting the endwise expansion and contraction of the cooking vessel 10 in relation to the support frame 12. As seen in FIG. 3, it is a relatively simple matter to weld end stops 48 to the horizontal leg or section 38 of the mounting rail 34 at a location outwardly of the endmost gusset 28' and its lateral stop 46' (see FIG. 3). The normal spacing between the end stop 48 and the end adjacent gussets 28', designated by the letter S, is such as to permit the desired longitudinal expansion of the kettle 10 incident to the heating thereof. The end stop 48 is at least of a vertical or horizontal dimension in relation to the cutout 44 to limit undesired lengthwise expansion of the kettle, which expansion is generally indicated by the directional arrow. In a typical installation the distance S may be of the order of one inch. In lieu of end stops 48 at the opposite ends of the mounting rail 34, individual stops may be provided at each gusset, as by affixing bolts on each of the stops 46.

Overlying the side beam 32 of the support frame 12 is a cover plate 50 which is held down by appropriate securement elements 52. The cover plate 50 includes a down-turned marginal flange 54 which extends about the drip flange 24 at the adjacent side of the kettle 10, as seen in FIGS. 2 and 4.

From the foregoing it will be appreciated that the kettle 10 is essentially of relatively simple construction and is heated using commercially available heating units. By the simple expedient of removing the cover 50, the vessel-receiving space between the mounting rails 34 is available such that the kettle 10 may be suspended therein or removed therefrom. When suspended with the support frame 12, the kettle 10 is capable of limited expansion both laterally and lengthwise in response to the heating thereof. Although the kettle is relatively free to accommodate in accordance with the heating thereof, such freedom is not without restraint to avoid the uncontrolled expansion of the kettle in relation to its supporting environment.

What I claim is:

1. In a food processing machine, a support frame having spaced and substantially coextensive mounting rails defining a vessel-receiving space therebetween, a metallic cooking vessel disposed in said space and including upstanding side walls extending above said mounting rails and each having an outwardly directed mounting flange overlying and spaced above the adjacent mounting rail, a plurality of spaced gussets secured to and depending from each of said mounting flanges and resting upon the adjacent mounting rail to suspend said vessel from said mounting rails in said space and cooperating means on said gussets and said mounting rails constructed and arranged to enable said vessel to expand and contract laterally but incident to the heating and cooling thereof within preset limits.

2. A food processing machine according to claim 1 wherein said cooperating means includes downwardly opening cutouts formed in each of said plurality of spaced gussets and a corresponding plurality of spaced stops secured to said mounting rails and extending into said cutouts, said cutouts being oversized in relation to said stops such that said suspended vessel is free for limited lateral expansion and contraction within the present limits established by the sizing of said cutouts.

3. A food processing machine according to claim 1 wherein each side wall and its mounting flange are disposed at right angles to each other and meet at a junction extending lengthwise of said vessel, said plurality of gussets for each mounting flange being fitted into the adjacent junction and being secured to both the adjacent side wall and mounting flange to impart structural reinforcement to said kettle at spaced locations lengthwise thereof.

4. A food processing machine according to claim 1 including a multiplicity of securing elements for attaching said mounting rails to said support frame, a number of said securing elements for each of said mounting rails permitting limited relative movement of said mounting rails with respect to said supporting frame.

5. A food processing machine according to claim 4 wherein said number of securing elements are received in oversized holes in said mounting rail.

6. A food processing machine according to claim 1 including means for limiting the lengthwise expansion of said vessel.

7. A food processing machine according to claim 6 wherein the lengthwise limiting means include end stops secured to said mounting rails and positioned to engage adjacent gussets upon lengthwise expansion of said kettle.

8. A food processing machine according to claim 1 including an upwardly directed drip flange formed on the outer edge of each mounting flange.

References Cited

UNITED STATES PATENTS

| | | | |
|---|---|---|---|
| 2,196,353 | 4/1940 | Carlo | 99—404 X |
| 2,552,441 | 5/1951 | McBeth | 99—405 |
| 2,558,892 | 7/1951 | Wise | 99—406 |
| 2,633,793 | 4/1953 | Wise | 99—405 |

ROBERT W. JENKINS, *Primary Examiner.*

U.S. Cl. X.R.

235—92; 325—31; 343—853; 346—37